US008223142B2

(12) United States Patent
Shimizu

(10) Patent No.: US 8,223,142 B2
(45) Date of Patent: Jul. 17, 2012

(54) DISPLAY PANEL DRIVE APPARATUS

(75) Inventor: Nobuyuki Shimizu, Hachiouji (JP)

(73) Assignee: Lapis Semiconductor Co., Ltd. (JP)

( * ) Notice: Subject to any disclaimer, the term of this patent is extended or adjusted under 35 U.S.C. 154(b) by 547 days.

(21) Appl. No.: 12/389,464

(22) Filed: Feb. 20, 2009

(65) Prior Publication Data

US 2009/0218958 A1 Sep. 3, 2009

(30) Foreign Application Priority Data

Feb. 29, 2008 (JP) ................................ 2008-049566

(51) Int. Cl.
*G06F 3/038* (2006.01)
*G09G 5/00* (2006.01)

(52) U.S. Cl. .......... 345/213; 345/77; 345/204; 345/212; 315/169.2; 315/169.3

(58) Field of Classification Search ............... 315/169.2, 315/169.3, 224, 247, 291, 299–301, 360; 345/76–77, 82, 204, 211–213, 690–691
See application file for complete search history.

(56) References Cited

U.S. PATENT DOCUMENTS

2002/0000982 A1* 1/2002 Takagi .......................... 345/204
2003/0227261 A1* 12/2003 Shimizu ..................... 315/169.3
2007/0211043 A1* 9/2007 Furuichi ...................... 345/204
2009/0009105 A1* 1/2009 Sakurai ........................ 315/291
2009/0091359 A1* 4/2009 Uchida et al. ................ 327/108

FOREIGN PATENT DOCUMENTS

| | | | |
|---|---|---|---|
| JP | 60-202484 | A | 10/1985 |
| JP | 2000-100563 | | 4/2000 |
| JP | 2003-131617 | A | 5/2003 |
| JP | 2004-013053 | A | 1/2004 |
| JP | 2005-062382 | A | 3/2005 |
| JP | 2009-092744 | A | 4/2009 |

OTHER PUBLICATIONS

Japanese Office Action "Notice of Reason for Rejection" with mailing date of Feb. 23, 2010; Japanese Patent Application No. 2008-049566.

* cited by examiner

*Primary Examiner* — Shawki S Ismail
*Assistant Examiner* — Jany Tran
(74) *Attorney, Agent, or Firm* — Studebaker & Brackett PC; Donald R. Studebaker

(57) ABSTRACT

A display panel drive apparatus which can keep display brightness constant, thus preventing the occurrence of unevenness in brightness. The drive apparatus includes a current controlling voltage generating circuit to generate a current control voltage. The drive apparatus also includes a plurality of output drivers to supply brightness pulses whose amplitude is decided based on the current control voltage respectively onto data lines of a display panel in synchronization with a clock signal. The drive apparatus also includes a clock generating circuit to generate a pulse signal of a pulse period based on the current control voltage as the clock signal.

9 Claims, 11 Drawing Sheets

PRIOR ART

PRIOR ART

PRIOR ART

DISPLAY PANEL DRIVE APPARATUS

BACKGROUND OF THE INVENTION

1. Field of the Invention

The present invention relates to a display panel drive apparatus.

2. Description of the Related Art

In recent years, the development of display panels using light-emitting elements such as organic EL elements has advanced, and display apparatuses having such display panel mounted thereon are becoming popular. A drive apparatus and method for organic EL elements on a display panel is disclosed in, for example, Japanese Patent Application Kokai (Laid-Open) No. 2000-100563 (Reference 1). The drive apparatus of Reference 1 includes a switching device serially connected to an organic EL device and a control unit for switching periodically on and off the switching device, thereby periodically supplying a certain amount of drive current to the organic EL device. This drive apparatus reduces brightness drop due to the degradation of the organic EL device.

There are two methods of controlling display gradation employed by a current-output-type display panel driver (drive apparatus). One method changes mainly the value of a current for driving a display panel (hereinafter called a drive current) and another method is a PWM (Pulse Width Modulation) method that changes time during which to output the drive current. The PWM method has an advantage that for each output terminal, only one control signal is needed to control time during which to output the drive current. The drive current is usually controlled by a power supply voltage different from that for logic circuits so as to match characteristics of the display device. Accordingly, a level shift circuit needs to be inserted in each control signal path. Hence, the smaller number of control signals results in smaller chip area. The PWM method is widely used for its advantage.

FIG. 1 of the accompanying drawings shows a display panel 100. A cathode driver group 210 and an anode driver group 310 in combination drive the display panel 100. In the display panel 100, pixels 111 to 1*mn* are arranged in a matrix with m rows by n columns, where m and n are positive integers. For example, in the first row there are arranged pixels 111, 112, . . . , 11*n*, and in the mth row there are arranged pixels 1*m*1, 1*m*2, . . . , 1*mn*. The anode driver group 310 includes output drivers 310-1 to 310-*n*. The output driver 310-1 outputs a brightness pulse do_1 of drive current Ia_1 onto a data line DL1; the output driver 310-2 outputs a brightness pulse do_2 of drive current Ia_2 onto a data line DL2; . . . ; and the output driver 310-*n* outputs a brightness pulse do_n of drive current Ia_n onto a data line DLn.

When displaying an image on the screen, one of selection lines SL1 to SLm is selected by the cathode drivers 210-1 to 210-*m*, and the anode driver group 310 supplies the drive current to each of the pixels connected to (or arranged on) the selected select line. The figure shows the case where the output voltage level of the cathode driver 210-2 is at 'L' (low level) and thus pixels 121, 122, . . . , 12*n* arranged in the second row are selected. The output voltage levels of other drivers than the cathode driver 210-2 are at 'H' (high level), and the pixels other than those in the second row are not selected. At this time, the output driver 310-1 supplies drive current Ia_1 to pixel 121; the output driver 310-2 supplies drive current Ia_2 to pixel 122; . . . ; and the output driver 310-*n* supplies drive current Ia_n to pixel 12*n*. The pixel 121 lights with brightness corresponding to the drive current Ia_1. In the case of the PWM method, the output driver 310-1 changes the pulse width of the brightness pulse do_1, thereby changing the value of the drive current Ia_1 to control the display gradation of the pixel 121. The same applies to the pixels 122, . . . , 12*n*.

FIG. 2 of the accompanying drawings shows a conventional display panel drive apparatus 300. The display panel drive apparatus 300 includes an output driver 310-*i*, where i is a positive integer from 1 to n, a current controlling voltage generating circuit 320, and a timing generating circuit 330. The display panel drive apparatus 300 usually includes a plurality of output drivers in addition to the output driver 310-*i*, but only the output driver 310-*i* is shown in the figure for simplicity of description. The display panel drive apparatus 300 uses current source circuits 311-*i* and 321 configured by MOS devices to obtain a constant current. The current source circuit 311-*i* has PMOS devices m1_i and m2_i. The source of the PMOS device m1_i is connected to a power supply voltage Vdd, and the drain thereof is connected to the source of the PMOS device m2_i. The drain of the PMOS device m2_i is connected to an output terminal 312-*i*, from which the brightness pulse do_i is output. A current control voltage ictrl from the current controlling voltage generating circuit 320 is applied to the gate of the PMOS device m1_i. The current control voltage ictrl is also applied commonly to the gate of the PMOS device of the current source circuit included in each of the other output drivers (not shown).

The current control voltage ictrl is generated by the current controlling voltage generating circuit 320. The circuit 320 includes the current source circuit 321, a current source 322, and an amplifier 323. The current source circuit 321 has PMOS devices m1_0 and m2_0. The source of the PMOS device m1_0 is connected to the power supply voltage Vdd, and the drain of the PMOS device m1_0 is connected to the source of the PMOS device m2_0. The drain of the PMOS device m2_0 is connected to the current source 322. The current control voltage ictrl from the amplifier 323 is applied to the gate of the PMOS device m1_0. The gate of the PMOS device m2_0 is connected to ground potential Vss. The amplifier 323 amplifies the drain voltage of the PMOS device m2_0 to apply the current control voltage ictrl to the gates of the PMOS device m1_i of the current source circuit 311-*i* included in the output driver 310-*i* and the PMOS device of the current source circuit included in each of (the) other output drivers (not shown) and also to the gate of the PMOS device m1_0 of the current source circuit 321 so that each drain current becomes equal to a reference current Iref.

The timing generating circuit 330 generates a PWM clock signal PC and a line trigger pulse signal LT and gives these signals to a drive pulse generating circuit 314-*i* included in the output driver 310-*i*. The PWM clock signal PC is used for each output driver to output a drive current corresponding to the gradation level #, and its clock pulse width is preset and invariable. The line trigger pulse signal LT is a signal for aligning output timings of the drive currents of the output drivers with each other. The timing generating circuit 330 also gives the PWM clock signal PC and the line trigger pulse signal LT to the drive pulse generating circuit included in each of the other output drivers (not shown).

The output driver 310-*i* includes the current source circuit 311-*i*, an output terminal 312-*i*, a data register 313-*i*, and the drive pulse generating circuit 314-*i*. The data register 313-*i* stores brightness data hd_i. The drive pulse generating circuit 314-*i* reads the brightness data hd_i from the data register 313-*i* and generates a drive pulse dd_i having a pulse width corresponding to the gradation level represented by the brightness data hd_i. The drive pulse generating circuit 314-*i* applies the drive pulse dd_i to the gate of the PMOS device m2_i. When the high-level drive pulse dd_i is applied to the gate of the PMOS device m2_i, the source-to-drain path is not electrically conductive. When the low-level drive pulse dd_i is applied, the source-to-drain path is rendered electrically conductive, and the brightness pulse do_i is generated from the output terminal 312-*i*. That is, the drive pulse dd_i is a signal for switching on/off the outputting of the brightness pulse do_i.

FIG. 3 of the accompanying drawings illustrates the operation waveforms of the display panel drive apparatus 300. Here, the number of gradation levels is 8 for simplicity of description. The drive pulse generating circuit 314-*i* starts outputting the low-level drive pulse dd_i at the time t0, i.e., when it receives a pulse of the line trigger pulse signal LT. The drive pulse generating circuit 314-*i* reads the brightness data hd_i from the data register 313-*i* and applies the low-level drive pulse dd_i to the gate of the PMOS device m2_i until the PWM clock period corresponding to the gradation level represented by the brightness data hd_i elapses. For example, if the gradation level represented by the brightness data hd_i is 1, the drive pulse generating circuit 314-*i* renders the drive pulse dd_i high in level at the time t1 (i.e., when the circuit 314-*i* receives a pulse of the PWM clock signal PC). The waveform of the drive pulse is indicated by dd_i (gradation level 1). If the gradation level represented by the brightness data hd_i is 6, the drive pulse generating circuit 314-*i* renders the drive pulse dd_i high in level at the time t3 (i.e., when the circuit 314-*i* receives six pulses of the PWM clock signal PC). The waveform of the drive pulse is indicated by dd_i (gradation level 6). Likewise, if the gradation level represented by the brightness data hd_i is 7, the drive pulse generating circuit 314-*i* renders the drive pulse dd_i high in level at the time t4, i.e., when the circuit 314-*i* receives seven pulses of the PWM clock signal PC. The waveform of the drive pulse is indicated by dd_i (gradation level 7).

When the low-level drive pulse dd_i is applied to the gate of the PMOS device m2_i, the source-to-drain path is rendered electrically conductive (i.e., ON), and the high-level brightness pulse do_i is output from the output terminal 312-*i*. For example, during the period from time t0 to t1, if the drive pulse of low level is applied to the gate of the PMOS device m2_i, the PMOS device m2_i is ON, and thus the brightness pulse do_i (gradation level 1) of high level is output from the output terminal 312-*i* during this time period. Likewise, if the drive pulse dd_i (gradation level 6) is applied to the gate of the PMOS device m2_i, the brightness pulse do_i (gradation level 6) is output, and if the drive pulse dd_i (gradation level 7) is applied, the brightness pulse do_i (gradation level 7) is output. Here, the amplitude of the brightness pulse do_i varies depending on the value of the current control voltage ictrl.

SUMMARY OF THE INVENTION

In the conventional display panel drive apparatus, when the drive pulse dd_i switches on and off the PMOS device m2_i, the amount of charge accumulated at the gate of the PMOS device m1_i connected serially to the PMOS device m2_i changes. Further, a change in the drain voltage causes the gate voltage of the PMOS device m1_i to change via parasitic capacitance between the gate and drain. Due to their influences, the value of the current control voltage ictrl applied to the gate of the PMOS device m1_i varies.

If the value of the current control voltage ictrl varies, the amplitude of the brightness pulse do_i also varies, so that the value of a drive charge amount Qa_1 varies which is the product of the amplitude and pulse width of the brightness pulse do_i. Since the display panel 100 displays an image with brightness corresponding to the drive current Ia_1 varying with the amount of the drive charge Qa_1, there is a problem that unevenness occurs in the brightness of the displayed image if the value of the drive charge amount Qa_1 varies.

One solution to reduce the variation in the value of the current control voltage ictrl is to enhance the output drive capacity of the amplifier 323 producing the current control voltage ictrl. However, because the current control voltage ictrl signal is usually connected to the gates of many PMOS devices, i.e., it has a large load capacitance, and because the variation is caused by output switching, it is difficult to configure the amplifier 323 that is able to sufficiently suppress the variation.

An object of the present invention is to provide a display panel drive apparatus which can keep display brightness constant even if the current control voltage ictrl varies, thus preventing the occurrence of unevenness in brightness without imparting an excess drive capacity onto the amplifier 323.

According to one aspect of the present invention, there is provided a display panel drive apparatus that drives a current-driven-type display panel via data lines. The drive apparatus includes a current controlling voltage generating circuit to generate a current control voltage. The drive apparatus also includes a plurality of output drivers to supply brightness pulses based on the current control voltage respectively onto the data lines in synchronization with a clock signal. The drive apparatus also includes a clock generating circuit to generate a pulse signal having a pulse period decided by the current control voltage. This pulse signal is used as the clock signal.

The clock generating circuit may shorten the pulse period when the current control voltage increases. The clock generating circuit may elongate the pulse period when the current control voltage decreases. Each output driver may include a drive pulse generating circuit to generate a drive pulse, whose pulse width corresponds to brightness data, in synchronization with the clock signal. Each output driver may also include a current source circuit to be switched on and off by the drive pulse, thereby generating a current pulse whose amplitude corresponds to the current control voltage. This current pulse may be used as the brightness pulse. The clock generating circuit may include at least one mirror current source circuit to generate a mirror current having a magnitude based on the current control voltage. The clock generating circuit may also include an integration circuit to integrate the mirror current. The clock generating circuit may include a pulse signal generating unit to generate, as the clock signal, a pulse signal having a pulse period based on integration time until an integral calculated by the integration circuit reaches a threshold value. The mirror current source circuit may include a mirror current controller to control the magnitude of the mirror current depending on the number of generated pulses of the pulse signal. The output drivers may be spatially arranged in parallel with each other such that the output drivers are divided into two groups and the clock generating circuit is sandwiched between the two groups of the output drivers. The output drivers and clock generating circuit may be provided on the same substrate, forming an integrated circuit.

These and other objects, aspects and advantages of the present invention will become apparent to those skilled in the art from the following detailed description when read and understood in conjunction with the appended claims and drawings.

DETAILED DESCRIPTION OF THE INVENTION

Embodiments of the present invention will be described in detail below with reference to the accompanying drawings.

First Embodiment

Figure 1:
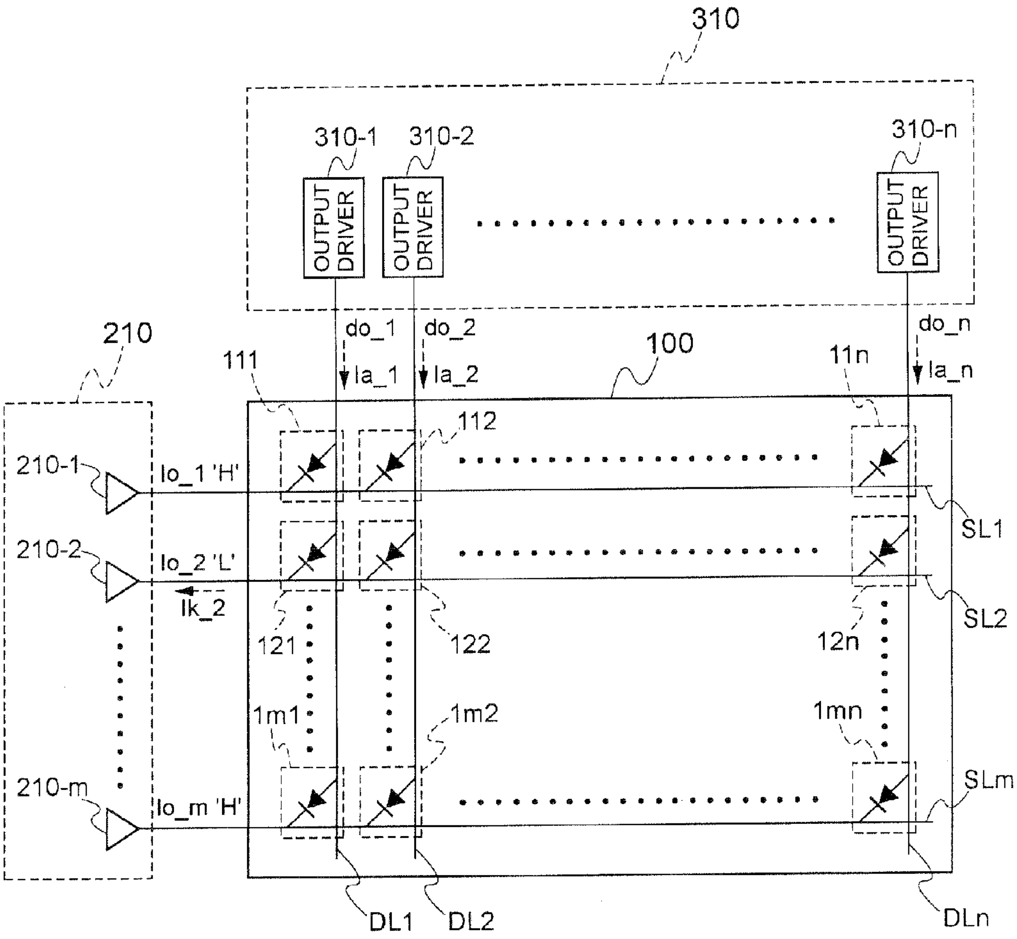
FIG. 1 shows a display panel together with a cathode driver group and an anode driver group that in combination drive the display panel.
Figure 2:
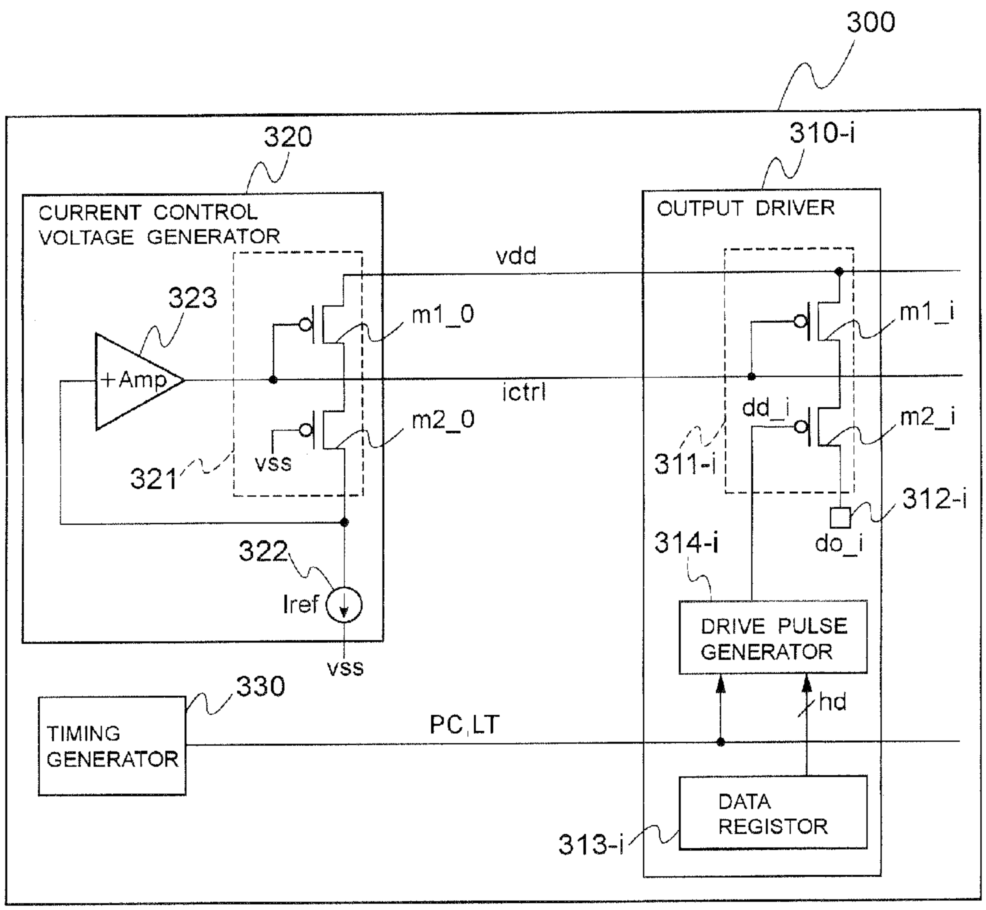
FIG. 2 shows a conventional display panel drive apparatus.
Figure 3:
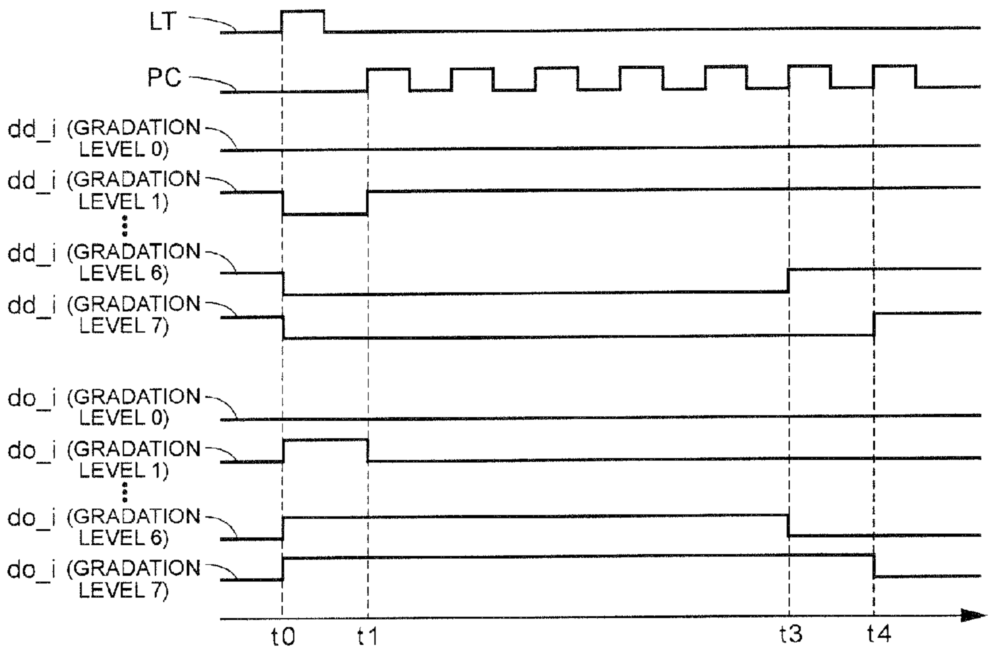
FIG. 3 shows the operation waveforms of the conventional display panel drive apparatus.
Figure 4:
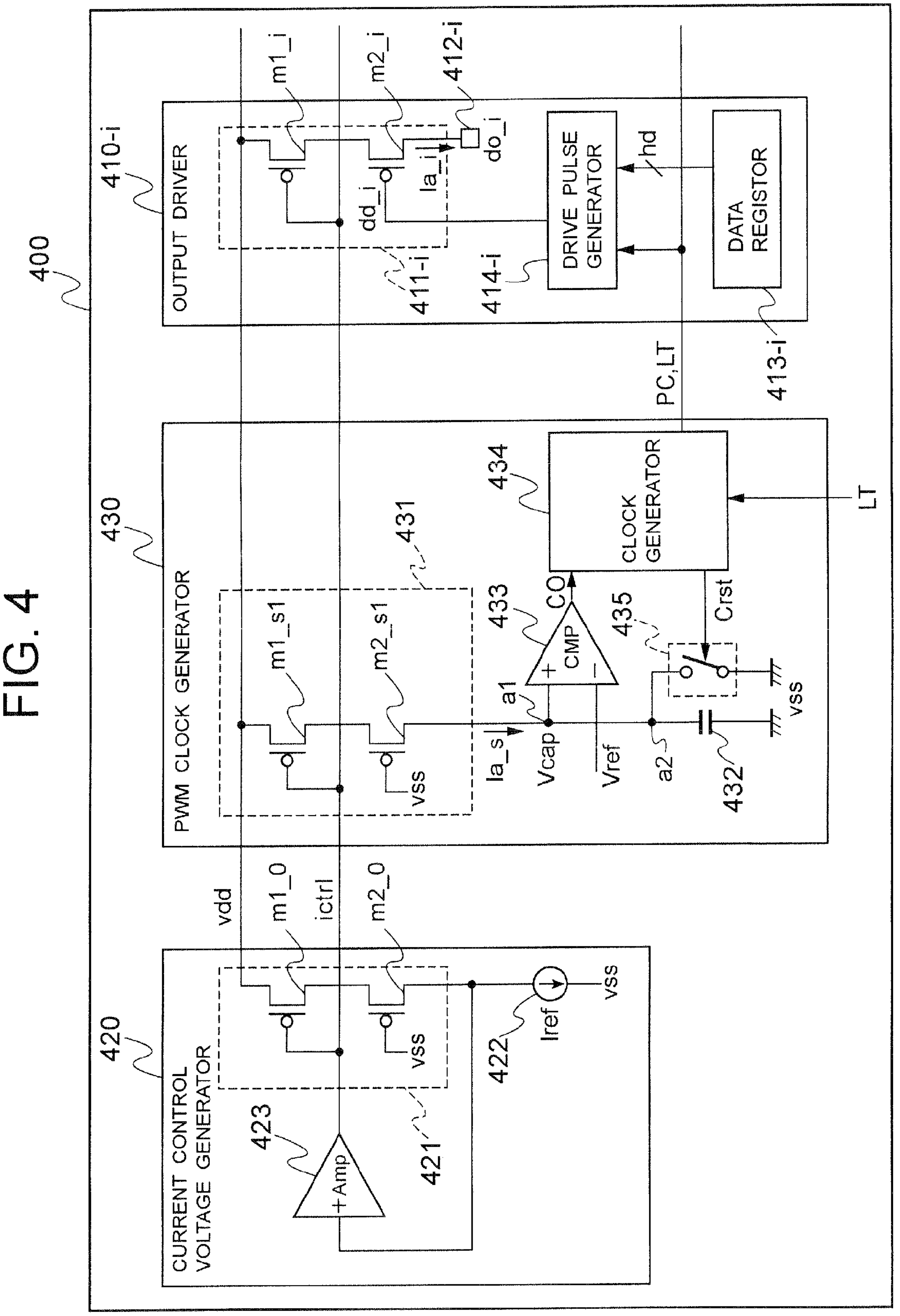
FIG. 4 is a block diagram of a display panel drive apparatus according to a first embodiment of the present invention.

Referring to FIG. 4, illustrated is a block diagram of a display panel drive apparatus 400 according to the first embodiment of the present invention. The display panel drive apparatus 400 drives a display panel and includes an output driver 410-*i*, a current controlling voltage generating circuit 420, and a PWM clock generating circuit 430. The display panel drive apparatus 400 usually includes other output drivers in addition to the output driver 410-*i*, but only the output driver 410-*i* is shown in the figure for simplicity of description. The total number of output drivers included in the display panel drive apparatus 400 is denoted as n, and the i is a positive integer from 1 to n. Also, a group of cathode drivers included in the display panel drive apparatus 400 are not shown for simplicity of description.

Figure 5:
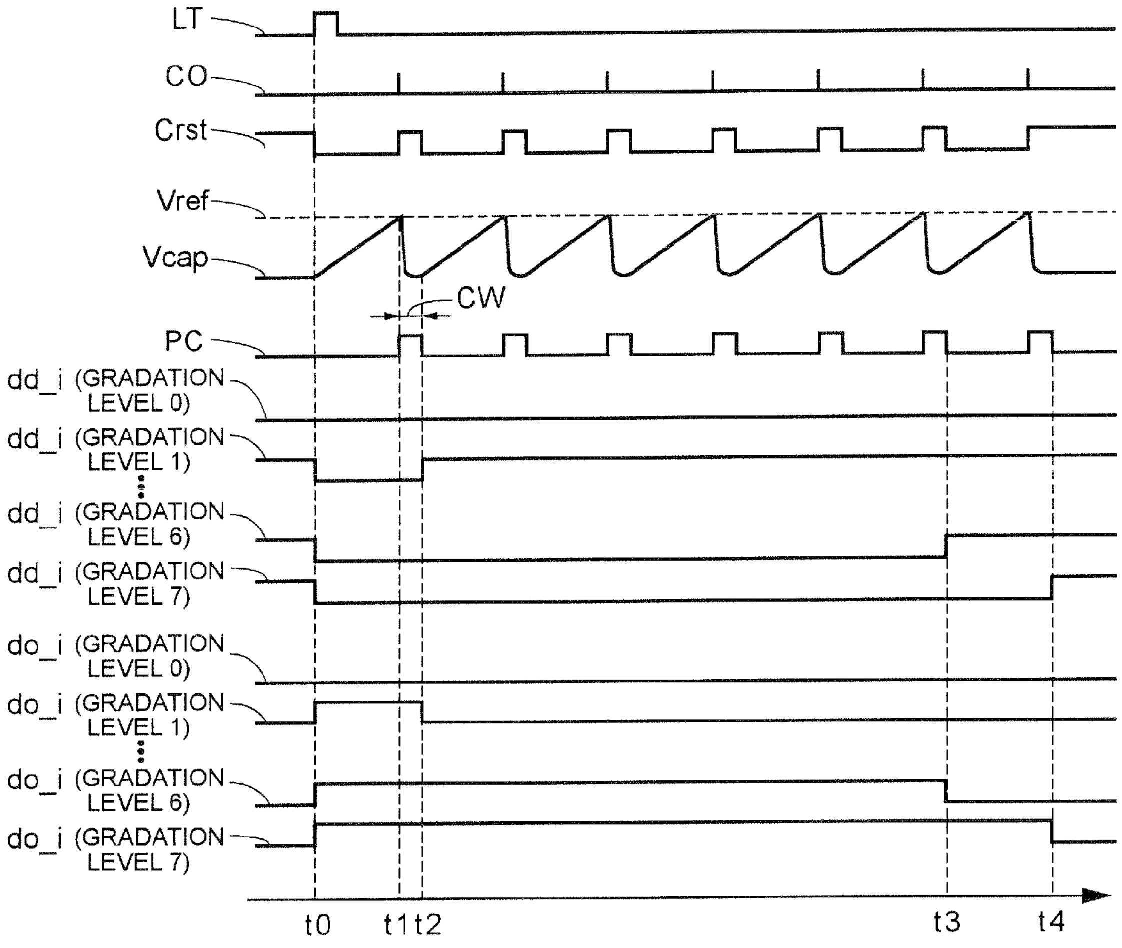
FIG. 5 illustrates operation waveforms of the display panel drive apparatus shown in FIG. 4.

The configuration and operation of the display panel drive apparatus 400 will be described with reference to FIG. 4 and FIG. 5. FIG. 5 illustrates operation waveforms in the display panel drive apparatus 400.

The current controlling voltage generating circuit 420 generates a current control voltage ictrl to control a drive current produced by each of the output driver 410-*i* and other output drivers (not shown). The circuit 420 includes a current source circuit 421, a current source 422, and an amplifier 423.

The current source circuit 421 has PMOS devices m1_0 and m2_0. The source of the PMOS device m1_0 is connected to the power supply voltage Vdd, and the drain of the PMOS device m1_0 is connected to the source of the PMOS device m2_0. The drain of the PMOS device m2_0 is connected to the current source 422. The current control voltage ictrl from the amplifier 423 is applied to the gate of the PMOS device m1_0. The gate of the PMOS device m2_0 is connected to ground potential vss. The amplifier 423 amplifies the drain voltage of the PMOS device m2_0 to apply the current control voltage ictrl to the gates of the PMOS device m1_i of the current source circuit 411-*i* included in the output driver 410-*i*, the PMOS device of the current source circuit included in each of the other output drivers (not shown), and the PMOS device m1_s of the mirror current source circuit 431 included in the PWM clock generating circuit 430 as well as to the gate of the PMOS device m1_0 of the current source circuit 421 so that each drain current becomes equal to a reference current Iref.

The PWM clock generating circuit 430 generates a PWM clock signal PC used for each output driver to output a drive current corresponding to the gradation level. The PWM clock generating circuit 430 includes the mirror current source circuit 431, a capacitor 432, a comparing unit 433, a clock producing circuit 434, and a switch 435.

The mirror current source circuit 431 has PMOS devices m1_s and m2_s. The current control voltage ictrl from the current controlling voltage generating circuit 420 is supplied to the gate of the PMOS device m1_s. The source of the PMOS device m1_s is connected to the power supply voltage vdd, and the drain of the PMOS device m1_s is connected to the source of the PMOS device m2_s. Because ground potential vss is supplied to the gate of the PMOS device m2_s, the source-to-drain path is rendered electrically conductive (ON). A mirror current Ia_s is output from the drain of the PMOS device m2_s. The value of the mirror current Ia_s varies with the current control voltage ictrl.

One end of the capacitor 432 is connected at a connection point a1 to the drain of the PMOS device m2_s, and the other end of the capacitor 432 is connected to ground potential vss. When the switch 435 is open, the capacitor 432 accumulates charge according to the value of the mirror current Ia_s. When the switch 435 is closed, the capacitor 432 discharges the accumulated charge. That is, the capacitor 432 serves as an integration circuit that integrates the mirror current Ia_s.

The comparing unit 433 is a 2-input, 1-output comparator circuit, and one input thereof is connected at the connection point a1 to one end of the capacitor 432. A preset threshold voltage Vref is introduced to the other input of the comparing unit 433. The potential on the connection point a1 is a capacitor potential Vcap which is decided by the amount of charge accumulated in the capacitor 432 according to the value of the mirror current Ia_s.

The comparing unit 433 compares the capacitor potential Vcap at the connection point a1 with the threshold voltage Vref and supplies a resulting signal (i.e., voltage comparison result signal CO) to the clock producing circuit 434. The comparing unit 433 gives the clock producing circuit 434 the voltage comparison result signal CO of low level when the comparing unit 433 determines that the capacitor potential Vcap is less than the threshold voltage Vref. On the other hand, the comparing unit 433 gives the clock producing circuit 434 the voltage comparison result signal CO of high level if the comparing unit 433 determines that the capacitor potential Vcap has reached the threshold voltage Vref.

As shown in FIG. 5, the switch 435 is opened at the time t0 (i.e., when a high level pulse of the line trigger pulse signal LT is introduced to the clock producing circuit 434), and the capacitor 432 starts accumulating charge according to the value of the mirror current Ia_s. As time elapses, charge is accumulated in the capacitor 432, and thus the capacitor potential Vcap increases. When the comparing unit 433 determines that the capacitor potential Vcap has reached the threshold voltage Vref at time t1, the comparing unit 433 gives the voltage comparison result signal CO of high level to the clock producing circuit 434.

The clock producing circuit 434 includes a pulse signal generating circuit for generating the PWM clock signal PC and a switch control signal generating circuit for generating a switch control signal Crst.

The pulse signal generating circuit generates a high-level pulse signal (namely, the PWM clock signal PC) in response to the high-level voltage comparison result signal CO supplied from the comparing unit 433. That is, the pulse signal generating circuit generates a pulse signal of a pulse period corresponding to integration time (i.e., time until the integral of the mirror current Ia_s by the capacitor 432 reaches a threshold value) as the PWM clock signal. The pulse width of the pulse signal is preset according to the discharge of the capacitor 432 and the time required for the operation of a drive pulse generating circuit 414-*i* of the output driver 410-*i* and of drive pulse generating circuits of other output drivers (not shown). The pulse signal generating circuit renders the PWM clock signal PC low when the voltage comparison result signal CO from the comparing unit 433 is at low level.

As shown in FIG. 5, the pulse signal generating circuit generates a high-level pulse signal (i.e., PWM clock signal PC) whose pulse width corresponds to the period from time t1 to t2 in response to the high-level voltage comparison result signal CO received from the comparing unit 433 at time t1, for example. After the preset time elapses (upon time t2), the pulse signal generating circuit causes the PWM clock signal PC to return to low level. The clock producing circuit 434 gives the PWM clock signal PC to the drive pulse generating circuit 414-*i* of the output driver 410-*i* and the drive pulse generating circuits of other output drivers (not shown). The clock producing circuit 434 is also designed to supply the external line trigger pulse signal LT to the output driver 410-*i* and other output drivers (not shown).

The switch control signal generating circuit starts generating a low-level switch control signal Crst at the time when it receives a high-level line trigger pulse signal LT from outside. The switch control signal generating circuit sends this control signal Crst to the switch 435 to open the switch 435. The switch control signal generating unit generates a high-level switch control signal Crst during the time when the PWM clock signal PC is at high level. The switch control signal generating unit supplies this high-level control signal Crst to the switch 435 to close the switch 435. Conversely, the switch control signal generating unit generates a low-level switch control signal Crst while the PWM clock signal PC is at low level, and gives this low-level control signal Crst to the switch 435 to open the switch 435.

As shown in FIG. 5, for example, at the time t0 (i.e., when the switch control signal generating unit receives a high-level line trigger pulse signal LT from the outside), the switch control signal generating unit starts generating a low-level switch control signal Crst and gives this control signal Crst to the switch 435 to open the switch 435. Upon the PWM clock signal PC becoming the high level signal at time t1, the switch control signal generating unit generates a high-level switch control signal Crst and gives this control signal to the switch 435 to close the switch 435. Upon the PWM clock signal PC becoming the low level signal at time t2, the switch control signal generating unit generates the low-level switch control signal Crst and gives this control signal to the switch 435 to open the switch 435.

One end of the switch 435 is connected at a connection point a2 to one end of the capacitor 432, and the other end of the switch 435 is connected to ground potential vss. The switch 435 opens in response to the low-level switch control signal Crst and closes in response to the high-level switch control signal Crst. When the switch 435 is open, charge is accumulated in the capacitor 432 according to the value of the mirror current Ia_s from the drain of the PMOS device m2_s. When the switch 435 is closed, the charge is released (discharged) from the capacitor 432.

The output driver 410-*i* includes the current source circuit 411-*i*, an output terminal 412-*i*, a data register 413-*i*, and the drive pulse generating circuit 414-*i*.

The current source circuit 411-*i* has the PMOS devices m1_i and m2_i. The current control voltage ictrl from the current controlling voltage generating circuit 420 is applied to the gate of the PMOS device m1_i. The source of the PMOS device m1_i is connected to the power supply voltage vdd, and the drain of the PMOS device m1_i is connected to the source of the PMOS device m2_i. The drive pulse dd_i from the drive pulse generating circuit 414-*i* is applied to the gate of the PMOS device m2_i. The drain of the PMOS device m2_i is connected to the output terminal 412-*i*, and a drive current Ia_i is output from the output terminal 412-*i*. Since the PMOS device m2_i is turned on and off by the drive pulse dd_i, the drive current Ia_i is output as a brightness pulse do_i.

The data register 413-*i* stores brightness data hd_i. The drive pulse generating circuit 414-*i* reads the brightness data hd_i from the data register 413-*i* and generates a drive pulse dd_i whose pulse width corresponds to the gradation level represented by the brightness data hd_i. The drive pulse generating circuit 414-*i* initially outputs the high-level drive pulse dd_i. Upon receiving a high level pulse of the line trigger pulse signal LT, the drive pulse generating circuit 414-*i* renders the drive pulse dd_i low. The drive pulse generating circuit 414-*i* has a counter (not shown) to count the number of pulses of the PWM clock signal PC and outputs a low-level drive pulse dd_i continuously until the number of pulses obtained by the counting becomes equal to the gradation level. The drive pulse generating circuit 414-*i* makes the drive pulse dd_i return to high level when the number of pulses becomes equal to the gradation level.

The PMOS devices constituting the current source circuits 411-*i*, 421, 431 and the current source circuits included in other output drivers (not shown) have the same electrical characteristics. Hence, the drive current Ia_i of the current source circuit 411-*i*, the drive current of the current source circuit included in each of other output drivers (not shown), and the mirror current Ia_s of the mirror current source circuit 431 vary in the same direction, i.e., increase/decrease with the current control voltage ictrl and have substantially the same current value.

As depicted in FIG. 5, the drive pulse generating circuit 414-*i* renders the level of the drive pulse dd_i of gradation level 1 to 7 low in response to a high level pulse of the line trigger pulse signal LT at the time to. For example, if the gradation level represented by the brightness data hd_i is 1, the drive pulse generating circuit 414-*i* makes the drive pulse dd_i return to high level upon receiving a single pulse of the PWM clock signal PC at the time t2. If the gradation level represented by the brightness data hd_i is 6, the drive pulse generating circuit 414-*i* makes the drive pulse dd_i return to high level upon receiving the sixth pulse of the PWM clock signal PC at the time t3. The similar applies to other gradation levels.

The drive pulse generating circuit 414-*i* applies the drive pulse dd_i to the gate of the PMOS device m2_i. When the high-level drive pulse dd_i is applied to the gate of the PMOS device m2_i, the source-to-drain path is not electrically conductive, and a brightness pulse do_i is not output from the output terminal 412-*i* (the level remains low). Conversely, when the drive pulse dd_i of low level is applied, the source-to-drain path is rendered electrically conductive, and a brightness pulse do_i is output from the output terminal 412-*i* (the level becomes high). That is, the drive pulse dd_i is a signal to switch on and off the outputting of the brightness pulse do_i.

As illustrated in FIG. 5, for example, when the low-level drive pulse dd_i (gradation level 1) is applied to the gate of the PMOS device m2_i at time t0, the brightness pulse do_i (gradation level 1) becomes the high level. When the high-level drive pulse dd_i (gradation level 1) is applied to the gate of the PMOS device m2_i at time t2, the brightness pulse do_i (gradation level 1) becomes the low level. The similar applies to other gradation levels.

Figure 6A:
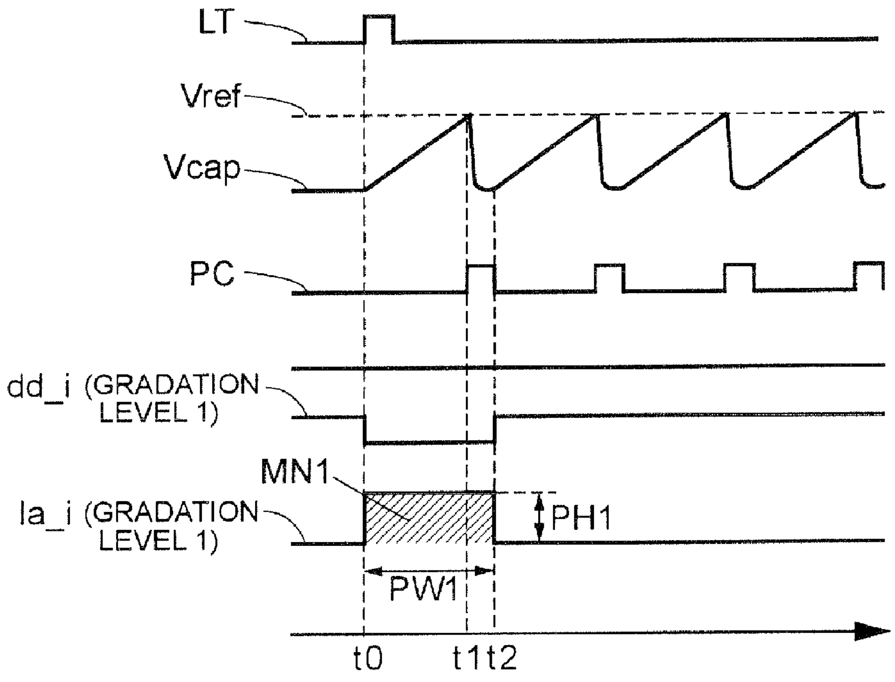
FIG. 6A shows operation waveforms of the display panel drive apparatus shown in FIG. 4 when a current-controlling voltage is low.
Figure 6B:
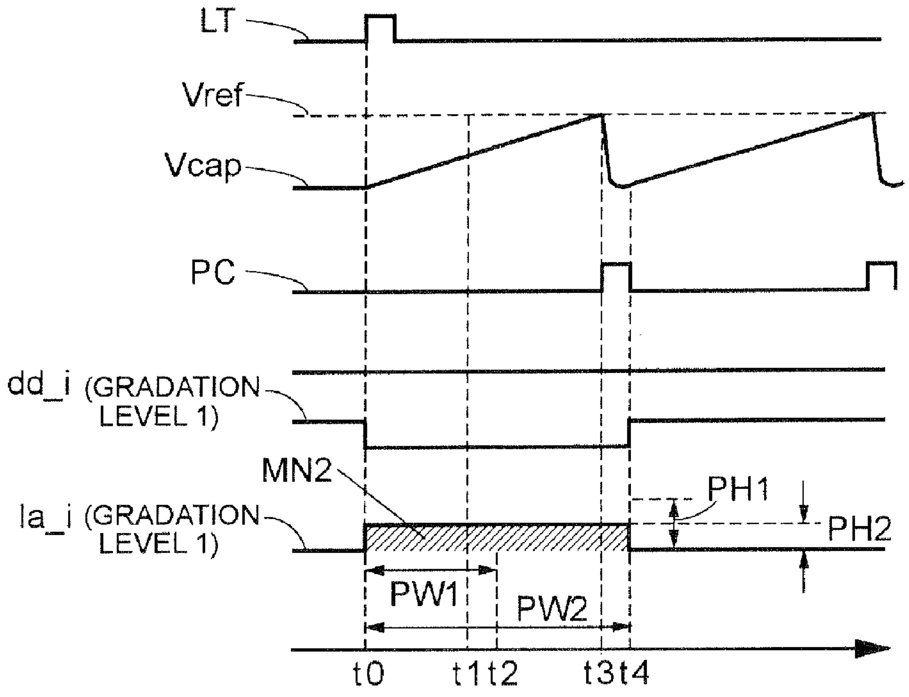
FIG. 6B shows operation waveforms of the display panel drive apparatus shown in FIG. 4 when the current-controlling voltage is high.

FIGS. 6A and 6B show operation waveforms of the display panel drive apparatus 400 for current control voltage ictrl_l and for current control voltage ictrl_h respectively. Both the figures show the waveforms for only the gradation level 1.

If the current control voltage ictrl varies toward the low level, the mirror current Ia_s increases, and thus the capacitor 432 is charged in a relatively short time. Hence, the capacitor voltage Vcap reaches the threshold voltage Vref in a relatively short time. Here, as shown in FIG. 6A, it is assumed that where the current control voltage ictrl varies toward the low level, the capacitor voltage Vcap reaches the threshold voltage Vref at time t1. In contrast, if the current control voltage ictrl varies toward the high level, the mirror current Ia_s decreases, and thus it takes a relatively long time until the capacitor 432 is charged. Hence, the time required for the capacitor voltage Vcap to reach the threshold voltage Vref is relatively long. As shown in FIG. 6B, where the current control voltage ictrl varies toward the high level, the capacitor voltage Vcap does not reach the threshold voltage Vref at time t1 but reaches the threshold voltage Vref at time t3.

If the current control voltage ictrl varies toward the low level, the drive current Ia_i from the drain of the PMOS device m2_i increases. Here, as shown in FIG. 6A, it is assumed that where the current control voltage ictrl varies toward the low level, the amplitude of the drive current Ia_i is PH1. In contrast, if the current control voltage ictrl varies toward the high level, the drive current Ia_i from the drain of the PMOS device m2_i decreases. As shown in FIG. 6B, where the current control voltage ictrl varies toward the high level, the amplitude of the drive current Ia_i is PH2, which is smaller than PH1.

Where the current control voltage ictrl varies toward the low level, one period of the PWM clock signal PC generated by the PWM clock generating circuit 430 lasts from time t0 to t2. The drive pulse generating circuit 414-*i* gives the gate of the PMOS device m2_i the low-level drive pulse dd_i from time t0 to t2 in response to the PWM clock signal PC from the PWM clock generating circuit 430. Thus, the brightness pulse do_i whose pulse width PW1 corresponds to the time length from time t0 to t2 is generated from the output terminal 412-*i*. In contrast, where the current control voltage ictrl varies toward the high level, one period of the PWM clock signal PC generated by the PWM clock generating circuit 430 lasts from time t0 to t4. The drive pulse generating circuit 414-*i* gives the gate of the PMOS device m2_i the low-level drive pulse dd_i from time t0 to t4 in response to the PWM clock signal PC from the PWM clock generating circuit 430. Thus, the brightness pulse do_i with a pulse width PW2 corresponding to the time length from time t0 to t4 is generated from the output terminal 412-*i*.

Where the current control voltage ictrl varies toward the low level, the value of a drive charge amount Qa_i is given as the product MN1 of the amplitude PH1 and pulse width PW1 of the drive current. Where the current control voltage ictrl varies toward the high level, the value of the drive charge amount Qa_i is given as the product MN2 of the amplitude PH2 and pulse width PW2 of the drive current. Because both the products MN1 and MN2 are equal to the amount of charge accumulated in the capacitor 432, and the capacitance of the capacitor 432 and the threshold voltage Vref are constant, the products MN1 and MN2 are the same value. Hence, the value of the drive charge amount Qa_i is kept constant even if the current control voltage ictrl varies. As a result, even if the current control voltage ictrl varies, the display brightness of the display panel is kept constant, thus preventing the occurrence of unevenness in brightness. In this manner, the display panel drive apparatus 400 of the present embodiment can prevent the occurrence of unevenness in brightness and keep the display brightness constant even if the current control voltage ictrl varies.

Figure 7:
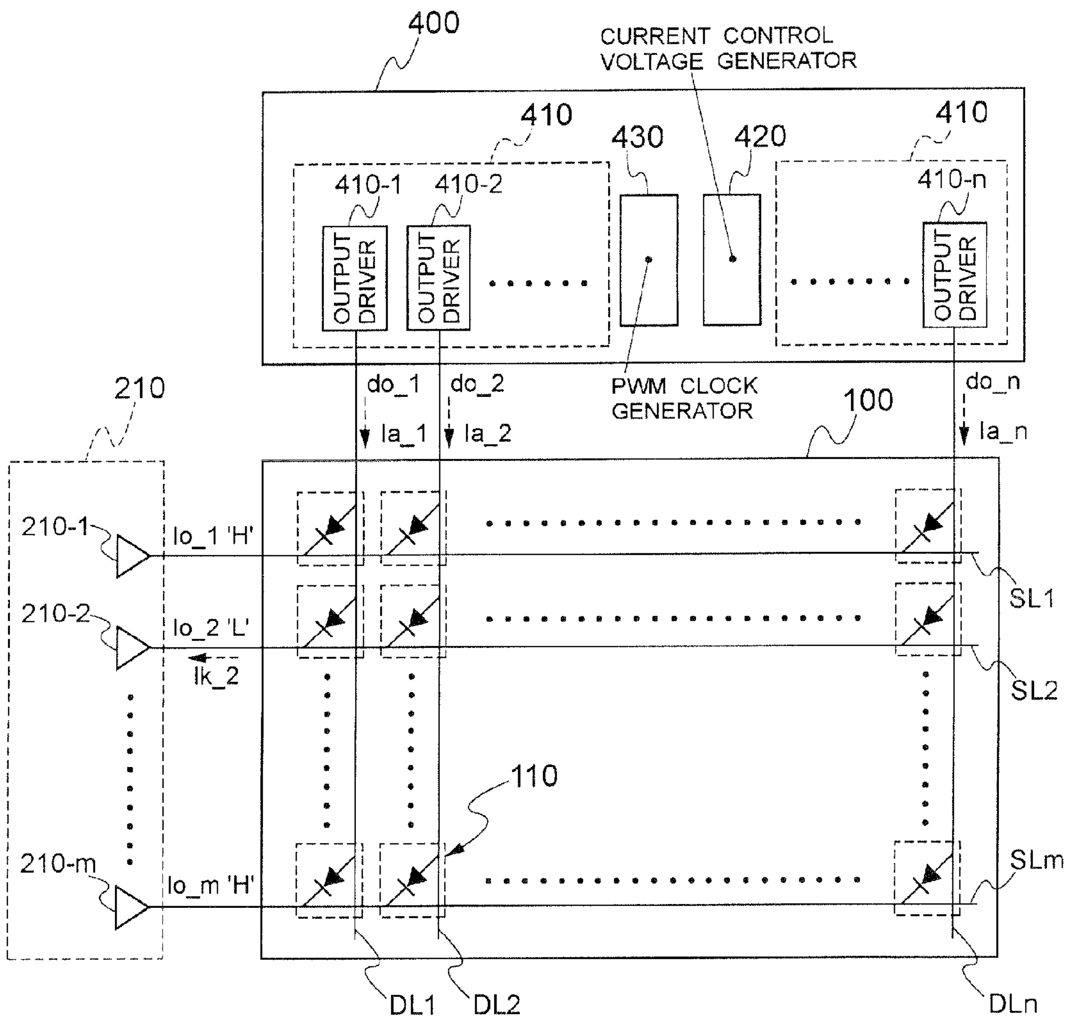
FIG. 7 shows a display panel with the display panel drive apparatus of FIG. 4.

FIG. 7 shows a display panel 100 together with the display panel drive apparatus 400. In the display panel 100, pixels 111 to 1*mn* are arranged in a matrix with m rows by n columns, where m and n are positive integers. For example, in the first row there are arranged pixels 111, 112, . . . , 11*n*, and in the mth row there are arranged pixels 1*m*1, 1*m*2, . . . , 1*mn*.

The output driver 410-1 supplies a brightness pulse do_1 of drive current Ia_1 onto a data line DL1, the output driver 410-2 supplies a brightness pulse do_2 of drive current Ia_2 onto a data line DL2, . . . , and the output driver 410-*n* supplies a brightness pulse do_n of drive current Ia_n onto a data line DLn. The output drivers 410-1 to 410-*n* supply the drive currents Ia_1 to Ia_n respectively to the pixels arranged on the selection line selected via one of the cathode drivers 210-1 to 210-*m*. FIG. 7 shows the case where the output voltage level of the cathode driver 210-2 is at 'L' (low level) and thus pixels 121, 122, . . . , 12*n* arranged in the second row are selected. The output voltage levels of other cathode drivers than the cathode driver 210-2 are at 'H' (high level), and therefore the pixels other than those in the second row are not selected.

At this time, the output driver 410-1 supplies drive current Ia_1 to pixel 121; the output driver 410-2 supplies drive current Ia_2 o to pixel 122; . . . ; and the output driver 410-*n* supplies drive current Ia_n to pixel 12*n*. The pixel 121 lights with brightness corresponding to the drive current Ia_1. As described above, the display panel drive apparatus 400 changes the pulse width of the brightness pulse do_1 according to the PWM clock signal PC and the brightness data hd_1, thereby changing the value of the drive current Ia_1 to control the display gradation (gradation level) of the pixel 121. The same applies to the pixels 122, . . . , 12*n*.

Because the drive current generated by each of the output drivers 410-1 to 410-*n* is set based on the mirror current Ia_s generated from the mirror current source circuit 431 of the PWM clock generating circuit 430, differences in characteristics between the PMOS devices m1_s and m2_s constituting the mirror current source circuit 431 and the PMOS devices constituting the current source circuits of the output drivers 410-1 to 410-*n* are preferably as small as possible. In general, characteristic differences between MOS devices formed in the same semiconductor device tend to be smaller as they have closer positions to each other.

In order to reduce the characteristic differences between the PMOS devices m1_s, m2_s constituting the mirror current source circuit 431 and the PMOS devices constituting the current source circuits of the output drivers 410-1 to 410-*n*, the PWM clock generating circuit 430 is preferably located between the two output driver groups 410. One group includes some of the output drivers 410-1 to 410-*n*, and the other group includes the remainder of these output drivers, as shown in FIG. 7. In particular, by placing the PWM clock generating circuit 430 in the center of the output drivers 410-1 to 410-*n* arranged in parallel, the distance between the PWM clock generating circuit 430 and the furthest output driver 410-1 (or 410-*n*) can be made shortest. With this arrangement the characteristic differences between the PMOS devices m1_s, m2_s constituting the mirror current source circuit 431 and the PMOS devices constituting the current source circuits of the output drivers 410-1 to 410-*n* become smallest. Thus, it is desirable to place the PWM clock generating circuit 430 in the center of the output drivers 410-1 to 410-*n* if the output drivers 410-1 to 410-*n* and the current controlling voltage generating circuit 420 are formed in a single semiconductor device such as an LSI chip.

In FIG. 7, the current controlling voltage generating circuit 420 is situated adjacent to the PWM clock generating circuit 430. However, because the drive current produced by each of the output drivers 410-1 to 410-*n* is decided based on the mirror current Ia_s supplied from the mirror current source circuit 431 of the PWM clock generating circuit 430, the location of the current controlling voltage generating circuit 420 is not limited to the illustrated location; the circuit 420 may be formed at another location. For the same reason, the elements other than the mirror current source circuit 431 included in the PWM clock generating circuit 430 (e.g., the capacitor 432) may be formed at other locations than the illustrated locations.

Second Embodiment

Figure 8:
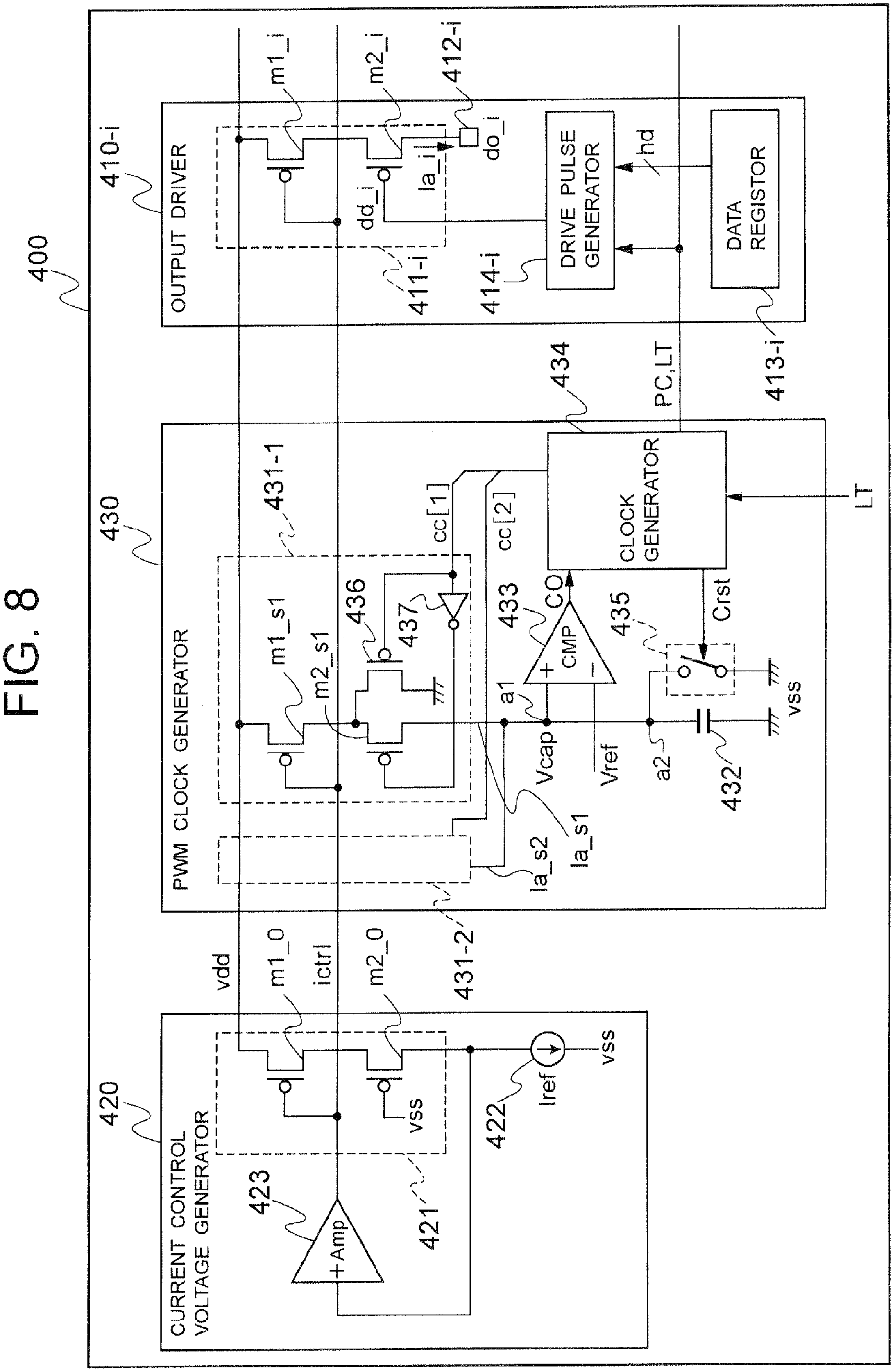
FIG. 8 is a block diagram of a display panel drive apparatus according to a second embodiment of the present invention.

FIG. 8 is a block diagram showing a display panel drive apparatus 400 according to the second embodiment. The configurations of the output driver 410-*i* and the current controlling voltage generating circuit 420 are the same as in the first embodiment. The differences from the first embodiment will be mainly described below. The PWM clock generating circuit 430 includes mirror current source circuits 431-1 and 431-2. A current control signal cc[1] from the clock producing circuit 434 is introduced to the mirror current source circuit 431-1, and a current control signal cc[2] from the clock producing circuit 434 is introduced to the mirror current source circuit 431-2. A mirror current Ia_s1 is generated from the mirror current source circuit 431-1, and a mirror current Ia_s2 is generated from the mirror current source circuit 431-2.

The configurations of the PMOS devices m1_s1 and m2_s1 constituting the mirror current source circuit 431-1 are the same as those of the PMOS devices m1_s and m2_s in the first embodiment. The current control signal cc[1] from the clock producing circuit 434 is inverted by an inverter 437 and supplied to the gate of the PMOS device m2_s5. Thus, when the current control signal cc[1] is at high level, the PMOS device m2_s1 is turned ON, and the mirror current Ia_s1 is generated. The drain of the PMOS device m1_s1 is connected to the source of the PMOS device 436. The drain of the PMOS device 436 is connected to ground potential vss, and the current control signal cc[1] is applied to the gate of the PMOS device 436. When the current control signal cc[1] is at high level, the PMOS device m2_s1 is turned OFF. When the PMOS device m2_s1 is ON, the PMOS device 436 is OFF, and conversely when the PMOS device m2_s1 is OFF, the PMOS device 436 is ON. Thus, the potential on the drain of the PMOS device m1_s1 is kept constant regardless of whether the current control signal cc[1] is at high level or at low level. In this manner, the current control voltage ictrl can be prevented from varying via parasitic capacitance between the gate and drain of the PMOS device m1_s1. The mirror current source circuit 431-2 has the same configuration as the mirror current source circuit 431-1. The PMOS devices of the mirror current source circuit 431-2 that correspond to the PMOS devices m1_s1, m2_s1 of the mirror current source circuit 431-1 are referred to as PMOS devices m1_s2, m2_s2.

Figure 9:
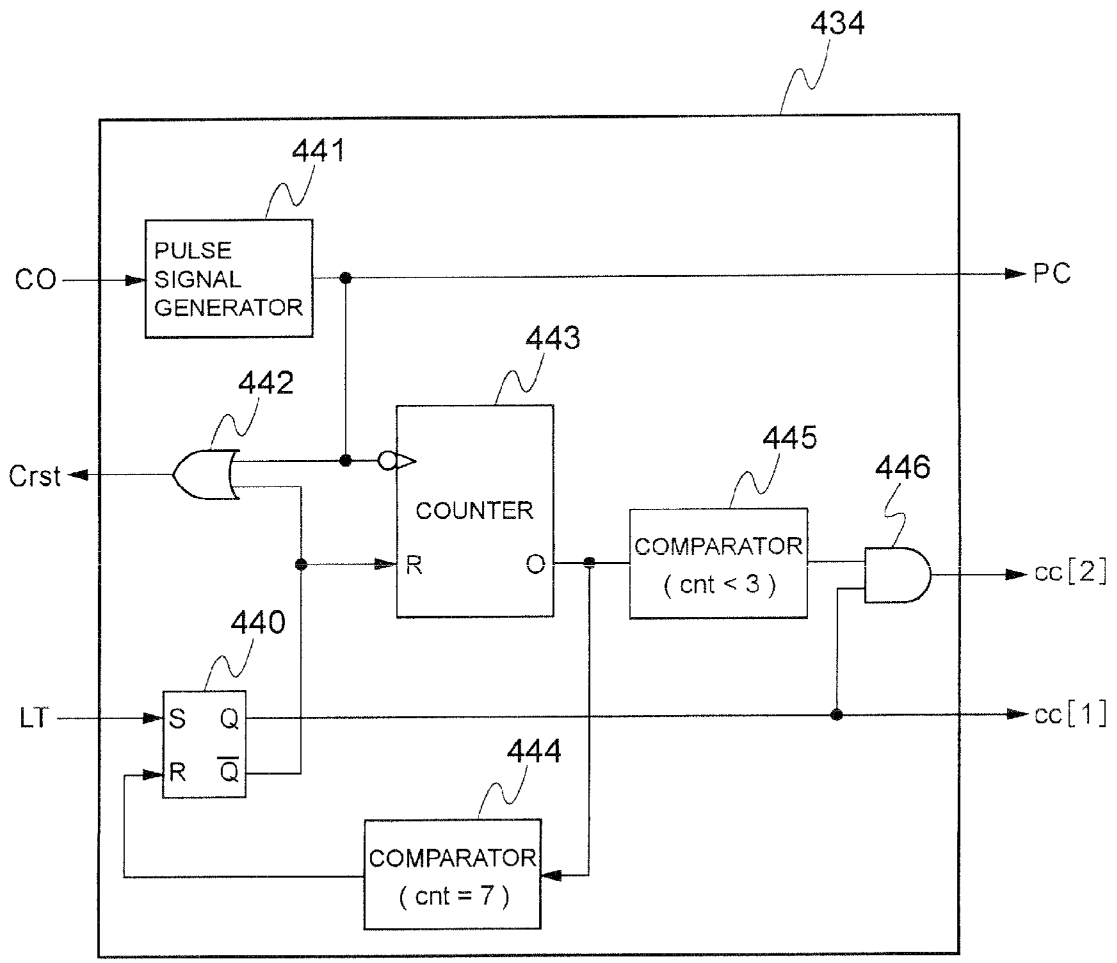
FIG. 9 is a circuit diagram of a control circuit according to the second embodiment.

FIG. 9 is a circuit diagram showing the clock producing circuit 434.

An RS flip-flop 440 starts outputting a high-level signal, as the current control signal cc[1], in response to the high-level external line trigger pulse signal LT. The RS flip-flop 440 also supplies the high-level signal to an AND circuit 446. At this time, the PMOS device m2_s1 becomes in the ON condition, and the mirror current source circuit 431-*i* starts outputting the mirror current Ia_s1. The RS flip-flop 440 generates a low-level signal, as the current control signal cc[1], in response to a high-level reset signal from a comparator 444, and also supplies the low-level signal to the AND circuit 446. At this time, the PMOS device m2_s1 becomes OFF, and the mirror current source circuit 431-1 stops outputting the mirror current Ia_s1. At the same time, the RS flip-flop 440 sends a high-level reset signal to a counter 443 and an OR circuit 442.

A pulse signal generating unit 441 generates a high-level pulse signal as the PWM clock signal PC in response to the high-level voltage comparison result signal CO from the comparing unit 433 and gives this signal to the counter 443 and the OR circuit 442 as well as to the output driver 410-*i* and other output drivers (not shown). The pulse width of the pulse signal is preset according to the discharge of the capacitor 432 and the time required for the operation of a drive pulse generating circuit 414-*i* of the output driver 410-*i* and of drive pulse generating circuits of the other output drivers (not shown). The pulse signal generating unit 441 renders the PWM clock signal PC low in level when the voltage comparison result signal CO from the comparing unit 433 is a low-level signal.

The PWM clock signal PC from the pulse signal generating unit 441 is introduced to one input of the OR circuit 442, and the reset signal from the RS flip-flop 440 is introduced to the other input of the OR circuit 422. The OR circuit 442 sends a high-level switch control signal Crst to the switch 435 when the PWM clock signal PC or the reset signal is at high level.

The counter 443 starts counting the number of pulses of the PWM clock signal PC from the pulse signal generating unit 441 in response to the reset signal from the RS flip-flop 440 and gives the obtained number of pulses to the comparators 444, 445.

When the number of pulses given from the counter 443 is 7, the comparator 444 generates the high-level reset signal and sends this reset signal to the RS flip-flop 440. When the number of pulses given from the counter 443 is not 7, the comparator 444 renders the reset signal low in level.

When the number of pulses from the counter 443 is 3 or less, the comparator 445 generates a high-level signal and supplies this signal to the AND circuit 446. When the number of pulses is 4 or greater, the comparator 445 generates the low-level signal and gives this signal to the AND circuit 446.

One input of the AND circuit 446 is connected to the output of the comparator 445, and the other input of the AND circuit 446 is connected to the output of the RS flip-flop 440. The AND circuit 446 generates the high-level current control signal cc[2] when both the output signals of the comparator 445 and of the RS flip-flop 440 are at high level. In this case, the PMOS device m1_s2 becomes ON, and a mirror current Ia_s2 is generated from the mirror current source circuit 431-2. When the output signal of the comparator 445 is at low level, the AND circuit 446 outputs the low-level current control signal cc[2]. In this case, the PMOS device m1_s2 is turned OFF, and the outputting of the mirror current Ia_s2 from the mirror current source circuit 431-2 is stopped. In the meantime, the mirror current source circuit 431-2 generates the mirror current Ia_s2 until the pulse signal generating unit 441 has generated three high-level pulses of the PWM clock signal PC, and stops generating the mirror current Ia_s2 when a fourth or subsequent pulse is produced.

Figure 10:
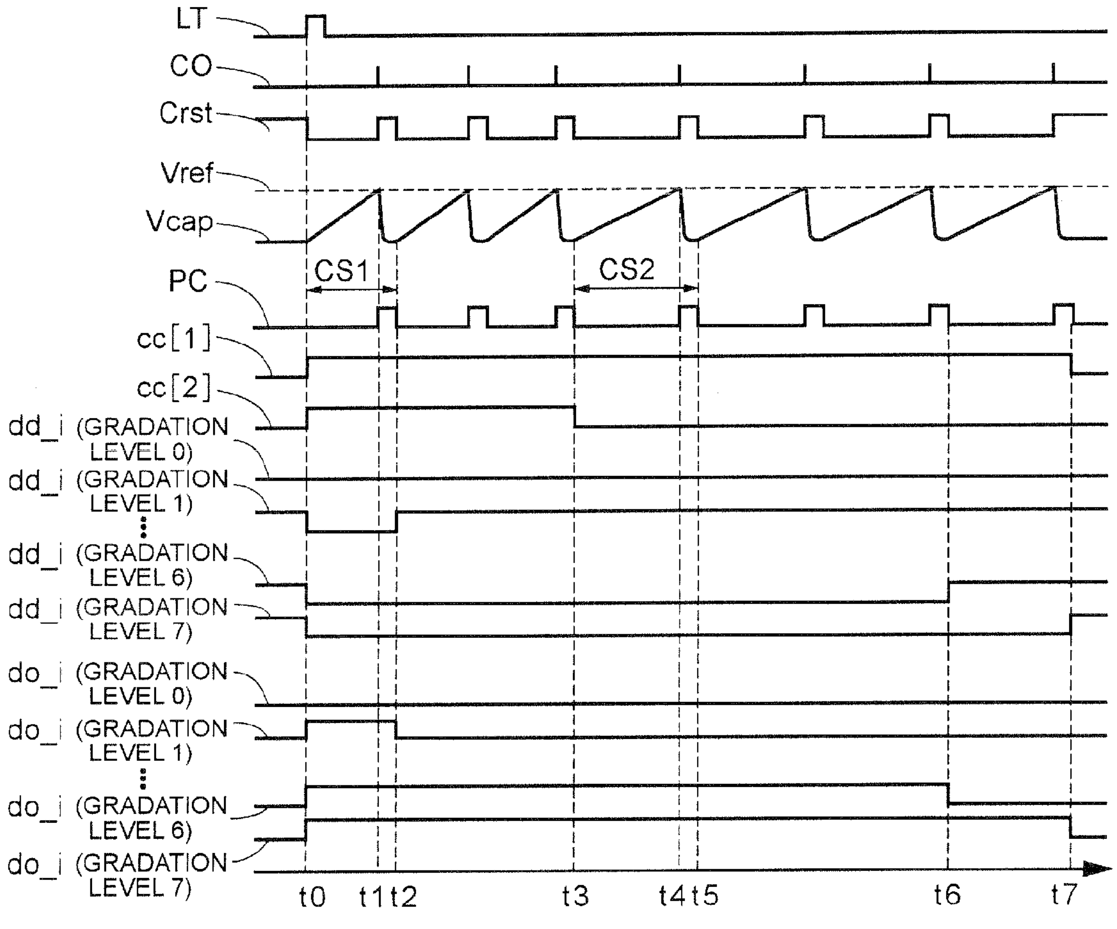
FIG. 10 shows operation waveforms of the display panel drive apparatus shown in FIG. 8.

FIG. 10 shows operation waveforms of the display panel drive apparatus 400. During the period from the time to (i.e., when the line trigger pulse signal LT is introduced) to the time t3 (i.e., when the pulse signal generating unit 441 has just generated the third high-level pulse), the current control signals cc[1] and cc[2] are at high level, and hence the PMOS device m2_s1 of the mirror current source circuit 431-1 and the PMOS device m2_s2 of the mirror current source circuit 431-2 are in the ON condition. Thus, the mirror current Ia_s1 is generated from the mirror current source circuit 431-1, and the mirror current Ia_s2 is generated from the mirror current source circuit 431-2. Because during this time period the capacitor 432 is charged by the sum of the mirror currents Ia_s1 and Ia_s2, the capacitor voltage Vcap reaches the threshold voltage Vref in a relatively short time. For example, where the gradation level denoted by the brightness data hd_i is 1, it is time t1 that the capacitor voltage Vcap reaches the threshold voltage Vref, and the period of the PWM clock signal PC is CS1 as indicated in FIG. 10.

At time t3, the current control signal cc[2] becomes a low level signal, and the PMOS device m2_s2 of the mirror current source circuit 431-2 is turned OFF. Hence, the outputting of the mirror currents Ia_s2 from the mirror current source circuit 431-2 is stopped. After time t3, since the capacitor 432 is charged by only the mirror current Ia_s1, the time required for the capacitor voltage Vcap to reach the threshold voltage Vref becomes longer than before time t3. It is time t4 that the capacitor voltage Vcap first reaches the threshold voltage Vref after time t3, and the period of the PWM clock signal PC becomes CS2 that is longer than CS1.

Figure 11:
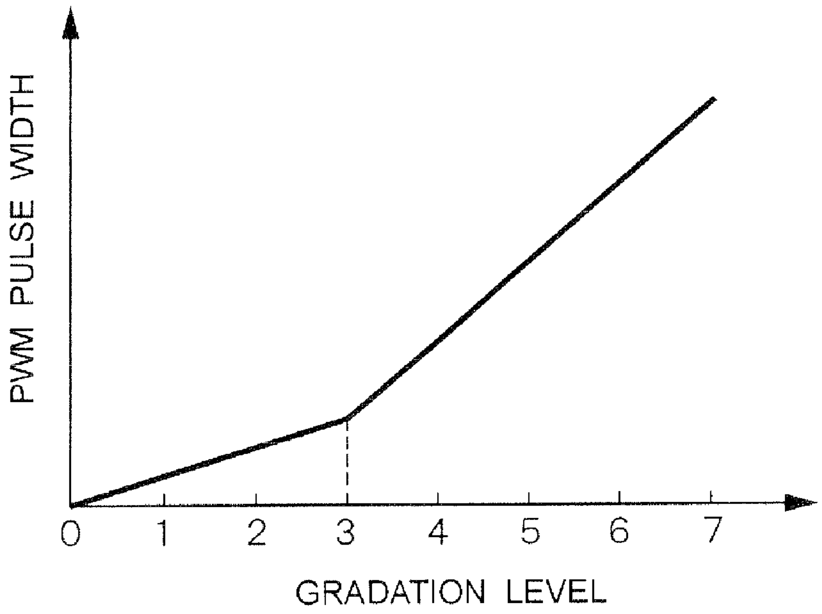
FIG. 11 is a graph showing a relationship between the gradation level and PWM pulse width.
Figure 12:
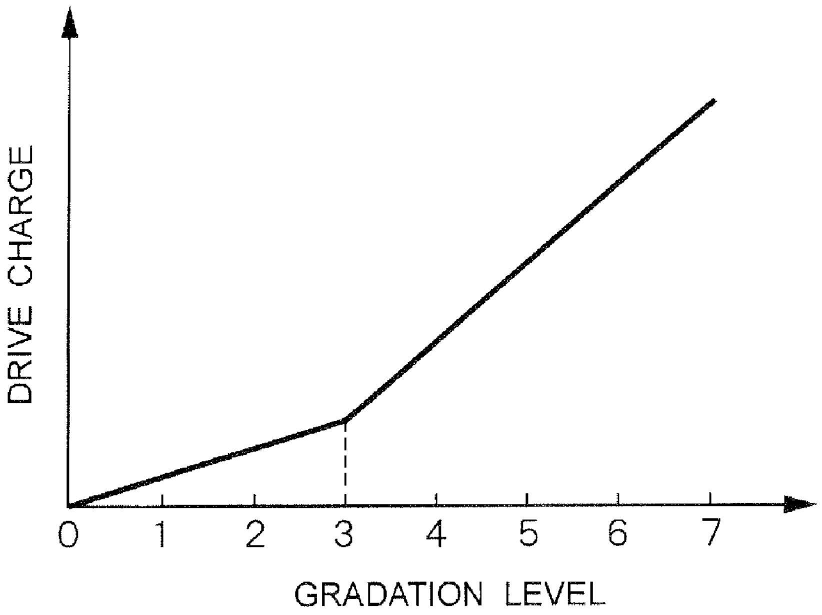
FIG. 12 is a graph showing a relationship between the gradation level and drive charge amount.

FIG. 11 shows the relationship between the gradation level and the PWM pulse width. As shown in the graph, the increase rate of the PWM pulse width is greater for the gradation levels 4 to 7 than for the gradation levels 0 to 3. However, the amplitude of the brightness pulse do_i generated from the output driver 410-*i* is constant even if the gradation level varies. Hence, the increase rate of the drive charge amount Qa_i is greater for the gradation levels 4 to 7 than for the gradation levels 0 to 3. The relationship between the gradation level and the drive charge amount is shown in FIG. 12.

As described above, the display panel drive apparatus 400 of this embodiment can increase the drive charge amount nonlinearly according to the gradation level denoted by the brightness data hd_i. Thus, even if the relationship between the drive charge amount and display brightness of the pixels 111 to 1*mn* of the display panel 100 is nonlinear, the display brightness can be kept linear, and the occurrence of unevenness in brightness can be prevented.

Although the PWM clock generating circuit 430 of the illustrated embodiment includes the two mirror current source circuits 431-1 and 431-2, the circuit 430 may include three or more mirror current source circuits and may operate in a similar manner to the illustrated embodiment. In this configuration, the increase rate of the drive charge amount according to the gradation level can be adjusted more minutely (precisely, finer).

Although the PWM clock generating circuit 430 of the present embodiment is configured to operate such that the increase rate of the drive charge amount Qa_i is greater for gradation level 4 to 7 than for gradation levels 0 to 3, it may be configured to operate such that the increase rate of the drive charge amount Qa_i is less for the gradation levels 4 to 7 than for the gradation levels 0 to 3 depending on characteristics of the pixels.

This application is based on Japanese Patent Application No. 2008-49566 filed on Feb. 29, 2008 and the entire disclosure thereof is incorporated herein by reference.

What is claimed is:

1. A display panel drive apparatus that drives a current drive type of display panel via data lines, comprising:

a current controlling voltage generating circuit to generate a current control voltage;

a plurality of output drivers to supply brightness pulses based on said current control voltage respectively onto said data lines in synchronization with a clock signal; and a clock generating circuit to generate a pulse signal having a pulse period based on said current control voltage, said pulse signal being used as said clock signal;

wherein each of said plurality of output drivers comprises:

a drive pulse generating circuit to generate a drive pulse whose pulse width corresponds to brightness data in synchronization with said clock signal; and a current source circuit to be switched on and off by said drive pulse, thereby generating a current pulse whose amplitude corresponds to said current control voltage, said current pulse being used as said brightness pulse, and wherein said clock generating circuit comprises:

at least one minor current source circuit to generate a minor current having a magnitude based on said current control voltage;

an integration circuit to integrate said mirror current; and a pulse signal generating unit to generate, as said clock signal, a pulse signal having a pulse period based on integration time required by said integration circuit until an integral calculated by said integration circuit reaches a threshold value.

2. A display panel drive apparatus according to claim 1, wherein said clock generating circuit shortens said pulse period when said current control voltage increases, whereas said clock generating circuit elongates said pulse period when said current control voltage decreases.

3. A display panel drive apparatus according to claim 1, wherein said minor current source circuit includes a minor current controller to control the magnitude of said minor current depending on the number of generated pulses of said pulse signals.

4. A display panel drive apparatus according to claim 1, wherein said plurality of output drivers are arranged in parallel with each other and are divided into two groups such that said clock generating circuit is sandwiched between said two groups of said output drivers.

5. A display panel drive apparatus according to claim 4, wherein said plurality of output drivers and said clock generating circuit are provided on the same substrate, forming an integrated circuit.

6. An apparatus for driving a current drive type of display panel via data lines, comprising:

means for generating a current control voltage;

a plurality of output drivers to supply brightness pulses based on said current control voltage respectively onto said data lines in synchronization with a clock signal; and clock means for generating a pulse signal having a pulse period based on said current control voltage, said pulse signal being used as said clock signal, whereby brightness of the display panel is maintained even if the current control voltage changes, wherein each of said plurality of output drivers comprises:

drive pulse means for generating a drive pulse whose pulse width corresponds to brightness data in synchronization with said clock signal; and current source means to be switched on and off by said drive pulse, thereby generating a current pulse whose amplitude corresponds to said current control voltage, said current pulse being used as said brightness pulse;

wherein said clock means includes:

mirror current means for generating a mirror current having a magnitude based on said current control voltage;

integration means for integrating said minor current; and means for generating, as said clock signal, a pulse signal having a pulse period based on integration time required by said integration means until an integral calculated by said integration means reaches a threshold value.

7. An apparatus according to claim 6, wherein said plurality of output drivers are divided into two groups and said clock means in placed between said two groups of said output drivers.

8. An apparatus according to claim 6, further comprises means for increasing an amount of drive charge non-linearly with a gradation level to be displayed.

9. An apparatus according to claim 7, further comprises means for increasing an amount of drive charge non-linearly with a gradation level to be displayed.

* * * * *